Patented July 29, 1924.

1,503,177

UNITED STATES PATENT OFFICE.

MAX WEILER, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

TRIARYLMETHANE DYE.

No Drawing.   Application filed March 19, 1924.   Serial No. 700,368.

*To all whom it may concern:*

Be it known that I, MAX WEILER, a citizen of Germany, residing at Elberfeld, in the State of Prussia, Germany, have invented new and useful Improvements in a New Triarylmethane Dye, of which the following is a specification.

My present invention relates to the manufacture and production of new and valuable dyestuffs of the triarylmethane series capable of dyeing wool chromed or aftertreated with chrome and being used for printing with chromium salts. They have most probably the following general formula:

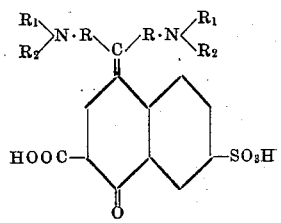

R stands for an aryl radicle, $R_1$ comprising hydrogen and alkyl groups and $R_2$ alkyl groups.

The new dyes are after being dried and pulverized generally greenish crystalline powders soluble in water with difficulty and easily soluble in caustic soda lye or sodium carbonate generally with a bluish coloration. They dye wool from acid baths a blue shade and before or after chroming also a blue shade. Cotton, treated or not treated with oil, can also be easily printed with the new dyestuffs.

The process for producing the new dyestuffs consists in condensing alkylated diaminobenzhydrols with 1-naphthol-2-carboxylic-7-sulfonic acid or 4.7-disulfonic acid and in oxidizing the resulting leucocompounds.

In order to illustrate my new process more fully the following example is given, the parts being by weight:—

15 parts of 1-naphthol-2-carboxylic-7-sulfonic acid and 13.5 parts of tetramethyldiaminobenzhydrol are stirred with 260 parts of sulfuric acid (90 per cent) until hydrol has disappeared. Then it is poured on ice and the largest part of the sulfuric acid is neutralized with sodium carbonate. The leuco acid thus obtained separates in the shape of a colourless crystalline powder. It is soluble in water with difficulty but easily soluble in alkalis, sodium carbonate or mineral acids, 25.3 parts of this leuco acid are dissolved in 14 parts of hydrochloric acid (30 per cent), 73 parts of water and 100 parts of glacial acetic acid and mixed together at about 40° C. with 11.7 parts of superoxide of lead which is previously diluted in a corresponding manner.

After the lead, precipitated with sulfuric acid, is filtered off, most of the dyestuff crystallizes from the filtrate in greenish glittering crystals. The residue is obtained by the addition of sodium carbonate. The new dye is after being dried and pulverized a greenish crystalline powder soluble in water with difficulty with a blue coloration and easily soluble in caustic soda lye or sodium carbonate also with a blue coloration. It has most probably the formula:

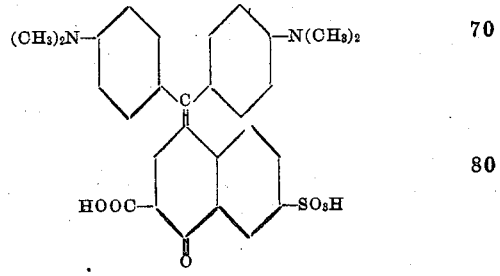

It dyes wool from an acid bath a pure bluish-red shade and wool chromed or aftertreated with chrome also the same shade. It prints cotton treated or not treated with oil a bluish-red shade.

Other oxidizing agents can also be used, such as manganese dioxide $MnO_2$.

By using tetraethyldiaminobenzhydrol a greener dyestuff is obtained. The use of the 1-naphthol-2-carboxylic-4.7-disulfonic acid yields the same product, because the sulfonic group in 4-position is eliminated by this process.

I claim:—

1. The herein described new triarylmethane dyes produced by condensing alkylated diaminobenzhydrols with 1-naphthol-2-carboxylic-7-sulfonic acid or 4.7-disulfonic acids and oxidizing the leucocompounds thus obtained having most probably the following general formula:

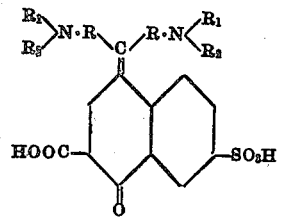

which dyestuffs are after being dried and pulverized greenish crystalline powders generally difficultly soluble in water and easily soluble in alkalis and sodium carbonate with a blue coloration, dyeing wool from acid baths blue and wool chromed or aftertreated with chrome also blue shades, and being used for printing with chromium salts, substantially as described.

2. The herein described new triarylmethane dye having most probably the formula:

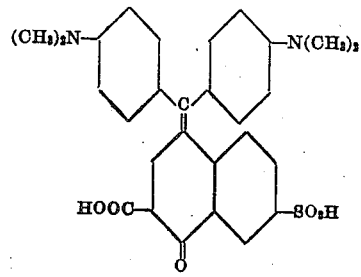

which is after being dried and pulverized a greenish crystalline powder difficultly soluble in water and easily soluble in caustic soda lye and sodium carbonate with a blue coloration, dyeing wool from acid bath and wool chromed or aftertreated with chrome a pure bluish-red shade, substantially as described.

In testimony whereof I have hereunto set my hand.

MAX WEILER.